(No Model.)
S. DARLING.
MICROMETER.
No. 287,420. Patented Oct. 30, 1883.
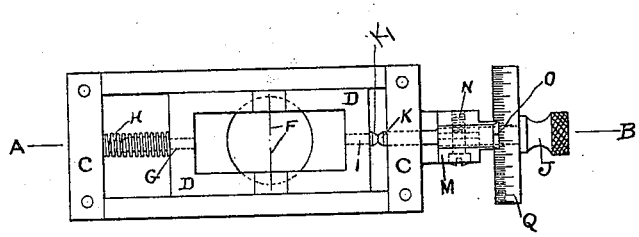
Fig. 1.
Fig. 8.
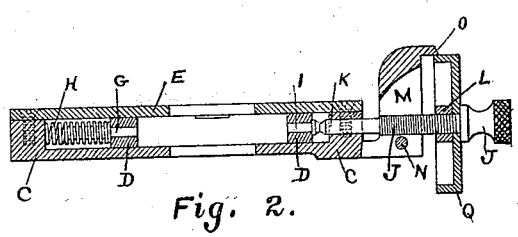
Fig. 2.   Fig. 3.
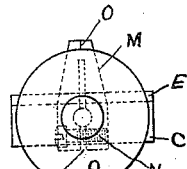
Fig. 7.
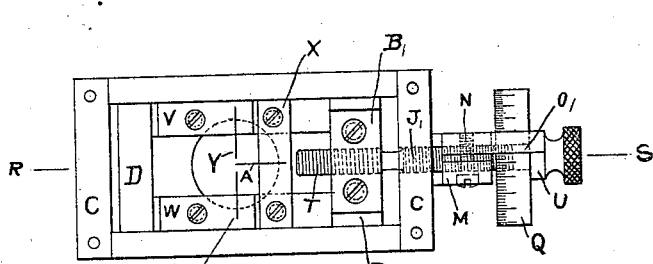
Fig. 4.
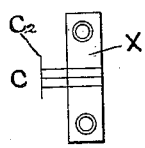
Fig. 5.   Fig. 6.
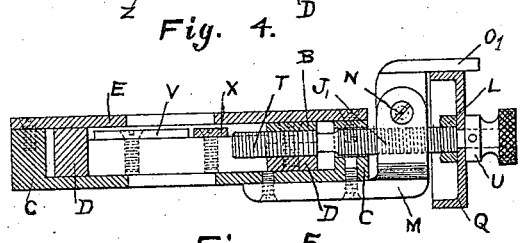
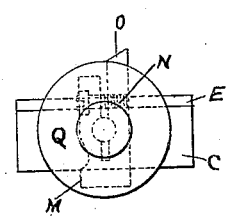
Witnesses:
Jacob Kettner
John E. Hall
Inventor:
Sam'l Darling

UNITED STATES PATENT OFFICE.

SAMUEL DARLING, OF PROVIDENCE, RHODE ISLAND.

MICROMETER.

SPECIFICATION forming part of Letters Patent No. 287,420, dated October 30, 1883.

Application filed March 1, 1883. (No model.)

*To all whom it may concern:*

Be it known that I, SAMUEL DARLING, of Providence, Rhode Island, have invented a new and useful Improvement in Micrometers for Microscopes; and I do hereby declare that the following, taken in connection with the drawings which accompany and form part of this specification, is a full, clear, and exact description of the invention, which will enable others skilled in the art to which it appertains to make and use the same.

The object of this invention is to make a micrometer having a screw and a nut in which there shall be no perceptible play between the threads of the screw and the nut, a micrometer in which the screw will revolve much farther relative to the motion of the cross-hairs than in the micrometers heretofore made, and a micrometer having a substitute for the common cross-hairs, (spider's web,) by which measurements can be made with greater accuracy and uniformity; and it consists in making a micrometer having a V-thread screw and nut, the nut being split at one end, and using a screw for tightening the nut; in making the frame that carries the cross-hairs with a very small hard abutting-piece that shall come against the end of the screw, which is also to be made hard and preferably small; in making a micrometer having two screws on the same piece, each made of a different pitch, and a whole or split nut for each part of the screw, one nut and the corresponding screw being attached to the frame that carries the cross-hairs; in making a micrometer having small wires, which may be of glass or any suitable material, instead of spider-webs, and in making a micrometer having short cross-wires parallel with and opposite to each other, leaving a space between them, and in various positions, so that the operator can have several points to guide him in adjusting the micrometer to the line on the article to be measured, and in making a micrometer having one or more movable pieces to hold the wires for the purpose of adjustment, all to be constructed and used as more fully described in the following specification.

It is well known to mechanics that a screw loose in the nut cannot be depended upon for great accuracy and uniformity in measurements, notwithstanding the slack may be taken up by a spring, as particles of matter are liable to get between the threads and cause errors. That difficulty is avoided in this improved micrometer. From experiment it is believed that the cross-hairs in a micrometer made according to this improvement can be adjusted to a line a number of times—say five, more or less—within an error of .00005 of an inch. It greatly facilitates the adjusting of the cross-hairs to a line to have the screw move a considerable part of a revolution for each division of the index-wheel. It is difficult to move the screw made in the ordinary way little enough to adjust the cross-hairs in the most accurate manner, and the difficulty in moving it little enough often influences the operator to accept an adjustment as correct with which he is not fully satisfied.

In the drawings I have illustrated a screw made in two parts on the same piece, one part being 20 pitch and the other 25 pitch, which gives a movement to the cross-hair frame of one one-hundredth ($\frac{1}{100}$) of an inch each revolution, this being intended for ordinary work; but in a micrometer for very fine measurements I should use a screw from 35 to 40 pitch. 36 and 37.037 pitches would be three four-thousandth inch, approximately, to each turn of the screw, and the object being magnified fifteen times, and the index-wheel divided into ten parts, one division on the wheel would be one two-hundred-thousandth ($\frac{1}{200000}$) of an inch, and the index-wheel being about one and two-tenths (1.2) inch in diameter, it will be seen that the lines on the screw or index-wheel will be over three and a half tenths (.35) apart, instead of one-tenth (.035) of that, when the wheel is divided into one hundred parts, in the usual way.

In the drawings, Figure 1 is a top view with the top E removed. Fig. 2 is a section through A B, Fig. 1; Fig. 3, an end view of Fig. 1; Fig. 4, a top view with the top E removed; Fig. 5, a section through R S, Fig. 4; Fig. 6, an end view of Fig. 4; Fig. 7, a top view of bar X and wires C; and Fig. 8, a screw-wheel divided into ten parts.

Referring to the drawings, it will be seen that I have illustrated two methods of making micrometers, which vary from each other in some respects. One method is shown in Figs. 1, 2, 3 and the other in Figs. 4, 5, 6, 7.

In Figs. 1, 2, and 3, C is a case with top removed, inclosing the cross-hair frame D.

F are wires attached to sliding frame D. These wires may be made of metal or any suitable material, and should be from one five-hundredth to one one-thousandth of an inch in diameter. Glass is a good material to make the wire of, as it can be pulled apart and a square end obtained. The wires can be secured to the frame by wax or any other suitable means. There may be one wire only, or two, as shown in Fig. 1, or any number desired, and they may be placed in any position, as shown at A, Z, and Y, Fig. 4, or C, Fig. 7, or any other preferred.

M is a split nut, (shown at P, Fig. 3.)

N is a screw for bringing the two parts of the nut together.

J is a screw which passes through nut N, and terminates in a small hardened abutting-end, K.

O is an index-line.

I is a small hardened abutting-piece attached to cross-hair frame D.

G is a rod for holding spring H in position.

Q is a graduated index-wheel.

E is the top to the case C.

V W X, Fig. 4, are adjustable pieces, to which the wires are attached; T, the part of the screw which is 20 pitch; J, the part that is 25 pitch. The screw J passes loosely through frame C.

It will be seen that by means of the split nut and screws N all play between the nut and the screw can be prevented. Nut B' may be split at one end, the same as nut M, or made in two parts, with two screws, as shown.

It is evident that with the nuts properly adjusted the frame that carries the wires, (cross-hairs,) Fig. 4, must move with the screw without variation. The arrangement shown in Figs. 1, 2, and 3 has the advantage of the split nut, and in addition to that very small abutting-surfaces, so that there will be much less liability for dust or oil to get between the abutting-surfaces K and I than in the usual form.

There is great advantage in having several points to aid in adjusting the cross-hairs to a line, C², Fig. 7. If the operator is in doubt whether one point coincides with the line, the other points will help him to decide correctly.

In Fig. 1 the nut M may be made in the frame D, as shown at B', Fig. 4, instead of being located outside of case C; but in that case the advantage of the small abutting-surfaces I and K would be lost; but it would be better than the usual form.

The index-wheel shown in Fig. 8 is, by way of illustration, divided into ten parts and each part into five fractional parts. Now, with the two pitch-screws 36 and 37.037 pitches, as above described, one division of the wheel will read one two-hundred-thousandth ($\frac{1}{200000}$) of an inch, and each fractional part will read one-millionth ($\frac{1}{1000000}$) of an inch, for, with a microscope that magnifies fifteen times, one turn of the screw being $\frac{3}{4000}$ and one division of the wheel being $\frac{3}{40000}$, and this magnified by fifteen times gives $\frac{3}{600000} = \frac{1}{200000}$, and one-fifth (the fractional parts) will give the $\frac{1}{1000000}$.

The advantage in using the end of a wire instead of the side of a spider-web, in the usual way, is that the full size of the line is always in view, and, having the wire nearly the size of the line, it is much easier to judge when the two coincide than when the line is covered by the cross-hairs, as in the common way, and when more wires than one are used each one will serve to correct a mistake that might be made with one alone.

Having described my improvement, what I claim as new, and desire to secure by Letters Patent, is—

1. A micrometer having a nut in or attached to the case C, which incloses the cross-hair sliding frame D, the nut being split or made in two parts, substantially as described.

2. A micrometer having two screws of different pitches on the same piece, with corresponding nuts, one nut being in or attached to the sliding frame D, that carries the cross-hairs, and the other nut in or attached to the case C, which incloses the sliding frame D, substantially as described, and for the purpose set forth.

3. A micrometer having one or more short cross-hairs or wires so arranged that the operator will be governed by their ends in adjusting them to the line on the article being measured, substantially as described.

4. A micrometer having small wires arranged substantially as described, whereby the ends of two or more of them may be adjusted to a line at the same time, thus giving more than one point to which the sight can be directed in adjusting the micrometer.

5. A micrometer having adjustable pieces A W V attached to the cross-hair frame D, to carry the small wires that take the place of the common "cross-hairs" or spider-web, substantially as described.

SAML. DARLING.

Witnesses:
JACOB KETTNER,
JOHN E. HALL.